(12) United States Patent
Rossini

(10) Patent No.: US 9,122,052 B2
(45) Date of Patent: Sep. 1, 2015

(54) COMPACT HEAD-UP DISPLAY

(71) Applicant: Commissariat à l'Energie Atomique et aux Energies Alternatives, Paris (FR)

(72) Inventor: Umberto Rossini, Coublevie (FR)

(73) Assignee: Commissariat à l'énergie atomique et aux énergies alternatives (FR)

( * ) Notice: Subject to any disclaimer, the term of this patent is extended or adjusted under 35 U.S.C. 154(b) by 65 days.

(21) Appl. No.: 13/971,928

(22) Filed: Aug. 21, 2013

(65) Prior Publication Data
US 2014/0055865 A1    Feb. 27, 2014

(30) Foreign Application Priority Data
Aug. 21, 2012   (FR) ..................................... 12 57903

(51) Int. Cl.
| | | |
|---|---|---|
| G02B 27/14 | (2006.01) | |
| G02B 27/01 | (2006.01) | |
| G02B 5/09 | (2006.01) | |
| G02B 3/08 | (2006.01) | |

(52) U.S. Cl.
CPC .............. *G02B 27/0101* (2013.01); *G02B 3/08* (2013.01); *G02B 5/09* (2013.01); *G02B 2027/013* (2013.01); *G02B 2027/015* (2013.01); *G02B 2027/0194* (2013.01)

(58) Field of Classification Search
CPC ....................................................... G02B 27/017
USPC .................................................. 359/630, 631
See application file for complete search history.

(56) References Cited

U.S. PATENT DOCUMENTS

| | | | |
|---|---|---|---|
| 4,900,133 A * | 2/1990 | Berman | ........................... 349/11 |
| 5,087,116 A | 2/1992 | Taylor, II | |
| 5,222,025 A | 6/1993 | Taylor, II | |
| 5,710,646 A | 1/1998 | Kimura et al. | |
| 7,656,585 B1 | 2/2010 | Powell et al. | |
| 2002/0171940 A1 * | 11/2002 | He et al. | ........................ 359/630 |

FOREIGN PATENT DOCUMENTS

JP    10194009 A    7/1998

OTHER PUBLICATIONS

Martin Casse, "Related French Patent Application No. 12/57903 Search Report", Apr. 11, 2013, Publisher: inpi, Published in: FR.

* cited by examiner

*Primary Examiner* — James Jones
(74) *Attorney, Agent, or Firm* — Kaplan Breyer Schwarz & Ottesen, LLP

(57) ABSTRACT

A head-up display, including an image source and a mirror positioned along parallel main planes and separated by a first distance, the mirror being shaped to form virtual images of the images provided by the image source at a second distance from the mirror, greater than the first distance.

10 Claims, 2 Drawing Sheets

COMPACT HEAD-UP DISPLAY

BACKGROUND

The present invention relates to a head-up display. More specifically, the present invention relates to such a display having a decreased bulk.

DISCUSSION OF THE RELATED ART

Head-up displays, also known as HUD, are augmented reality display systems which enable to overlay visual information on a real scene seen by an observer. In practice, such systems may be placed in a helmet visor, in the cockpit of a plane, or in the passenger compartment of a vehicle. They are thus positioned at a short distance from the observer's eyes, for example, between a few centimeters and a few tens of centimeters.

Such devices are based on the same principle, whatever the targeted application. A beam splitter is placed between the observer's eye and a scene to be observed. In the case of a HUD intended for aircrafts, the objects of the scene to be observed are generally located at infinity or at a significant distance from the observer. In the case of a HUD intended to be placed in a vehicle, for example, a car, the objects of the scene to be observed are generally located closer to the observer, generally a few meters away from him (in front of the vehicle). This especially corresponds to the case where additional information is desired to be displayed at the bottom of the vehicle windshield. The beam splitter is arranged relative to the scene and to the observer so as to transmit the information from the scene to the observer, without altering this information.

A system for projecting the information to be displayed is further provided, for example, a screen. Such a projection system is placed relative to the beam splitter so that it combines the information of the observed scene and the information provided by the screen to the observer. Thus, the observer visualizes an overlay of the projected image and of the scene.

In the case of a HUD for aircrafts, the image projected by the display should be seen at infinity by the observer to avoid accommodation problems. For this purpose, the projection system may comprise a screen located at the primary focal point of an optical system. The rays at the output of the optical system are then focused at infinity.

In the case of a HUD intended to be integrated in a vehicle, the windshield often plays the role of a beam splitter. It is provided to be sufficiently reflective on the observer side to provide the reflection of the information intended for the observer, while remaining transmissive for information originating from the scene. In practice, the forming of such a device is not easy, the curvature of the windshield having to be taken into account to size the HUD.

Another disadvantage of head-up displays for vehicles is that they are generally surface-area intensive, and thus poorly compatible with passenger compartments of low volume.

There thus is a need for a head-up display of decreased bulk, which provides the forming, for the observer, of an image projected at a distance of a few meters ahead of the vehicle.

In should be noted that in this general description, the notion of vehicle should be understood in a wide sense as comprising any means of transportation where an augmented reality device can be integrated and for which the image seen by the observer should be formed by this device at a distance from the observer ranging between one meter and a few tens of meters.

SUMMARY

An object of an embodiment of the present invention is to provide a compact head-up display capable of being integrated in a vehicle.

Thus, an embodiment of the present invention provides a head-up display, comprising an image source and a mirror positioned along parallel main planes and separated by a first distance d, the mirror being shaped to form virtual images of the images provided by the image source at a second distance D from the mirror, greater than the first distance.

According to an embodiment of the present invention, the mirror comprises elementary portions, angle $\mu$ of each elementary portion with respect to the main plane of the mirror, according to distance h between the projection of the center of the portion on the plane of the image source and the center of the image source being defined by the following equation:

$$\mu(h) = a\cos\left(\arctan\left(\frac{Gd}{h}\right) - \arctan\left(\frac{d}{h}\right)\right),$$

$\theta$ being defined by $\theta = \arctan(h/d)$, G being the ratio between the second D and the first distance d, f(G) being a negative or zero value, and a being a constant parameter.

According to an embodiment of the present invention, value f(G) is non zero and determined by a ray tracing optimization step.

According to an embodiment of the present invention, the mirror has a thickness lower than 1 cm.

According to an embodiment of the present invention, the mirror is formed of a stack of two layers of same index separated by a broken line comprising inclined portions having their slope following equation $\mu(h)$, interconnected by portions perpendicular to the main plane of the mirror.

According to an embodiment of the present invention, the inclined portions of the broken line are metallized.

According to an embodiment of the present invention, the metallization of the inclined portions of the broken line is made of a material having a transmission rate greater than or equal to 70%.

According to an embodiment of the present invention, the two layers of same index are covered with an antireflection layer.

An embodiment further provides a vehicle dashboard comprising a head-up display such as described hereabove.

According to an embodiment of the present invention, the image source and the mirror are retractable in the dashboard.

According to an embodiment of the present invention, the image source and the mirror are assembled on axes to be folded into a recess of the dashboard.

BRIEF DESCRIPTION OF THE DRAWINGS

The foregoing and other features and advantages of the present invention will be discussed in detail in the following non-limiting description of specific embodiments in connection with the accompanying drawings, among which.

For clarity, the same elements have been designated with the same reference numerals in the different drawings and, further, as usual in the representation of optical systems, the various drawings are not to scale.

DETAILED DESCRIPTION

Figure 1:
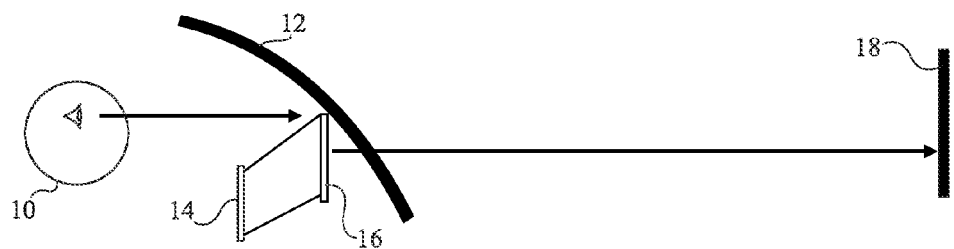
FIG. 1 schematically illustrates the principle of a head-up display according to an embodiment.

FIG. 1 illustrates the general principle of a head-up display adapted to an integration in a vehicle according to an embodiment.

An observer 10 is placed behind a windshield 12, schematically shown as a curve section in FIG. 1. The observer is placed relative to the windshield so that he sees the outside of the passenger compartment via the windshield, especially horizontally. The projection device comprises, in the shown example, a screen 14 positioned to deliver images towards windshield 12. In use, screen 14 is vertically arranged. A mirror 16 is placed, in the shown example, along a vertical direction (main plane of the mirror), on the projection path of screen 14. Mirror 16 is positioned relative to windshield 12, for example, at the bottom thereof, so that the observer obtains augmented reality information by looking towards mirror 16. Screen 14 thus projects information towards mirror 16, which reflects it towards observer 10. The mirror is provided to let through part of the information from the outer scene towards the observer.

As seen previously, the space assigned to the integration of a head-up display in the passenger compartment of a vehicle is relatively small. As disadvantage of a device comprising a screen 14 coupled to a mirror 16 is that this device forms a virtual image, that is, the image seen by observer 10, at a distance equal to that separating screen 14 from mirror 16. Thus, in practice, this image is formed in a very close plane for the observer. This implies performing an accommodation effort to obtain the projected information, with respect to the scene observed behind the mirror. Such an effort is not desired, the accommodation taking a time which is not compatible with the provision of information to a driver.

It is here provided to use a mirror 16 structured in such a way that virtual image 18 that it projects is seen by observer 10 at a distance ranging between one meter and some ten meters, for example, on the order of 1.5 meter. It is further provided to form a relatively compact mirror 16, that is, having a thickness lower than 1 cm, so that this mirror can for example be integrated in a device retractable in the vehicle dashboard.

Figure 2:
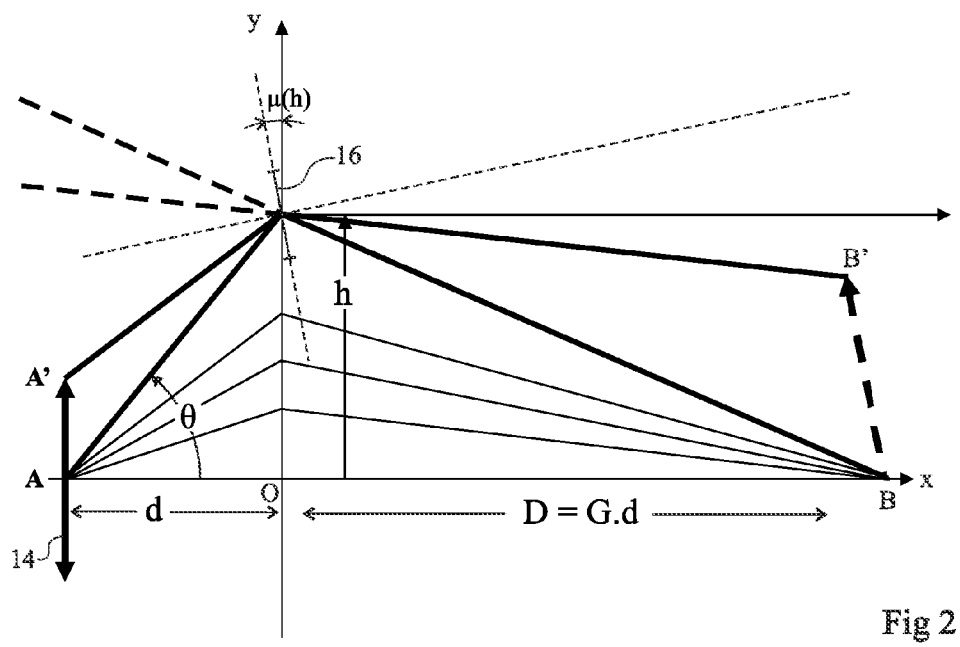
FIGS. 2 and 3 illustrate means for determining the shape of the reflection system of a head-up display according to an embodiment.
Figure 3:
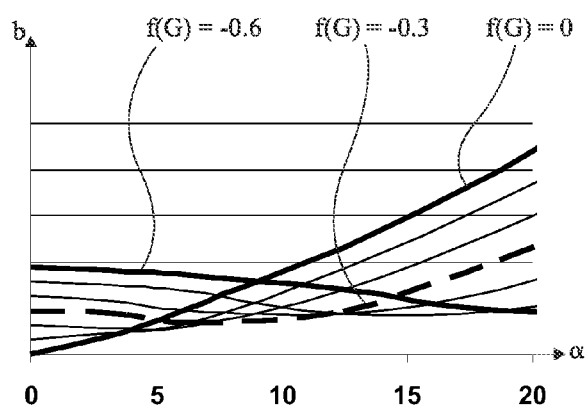
Figure 4:
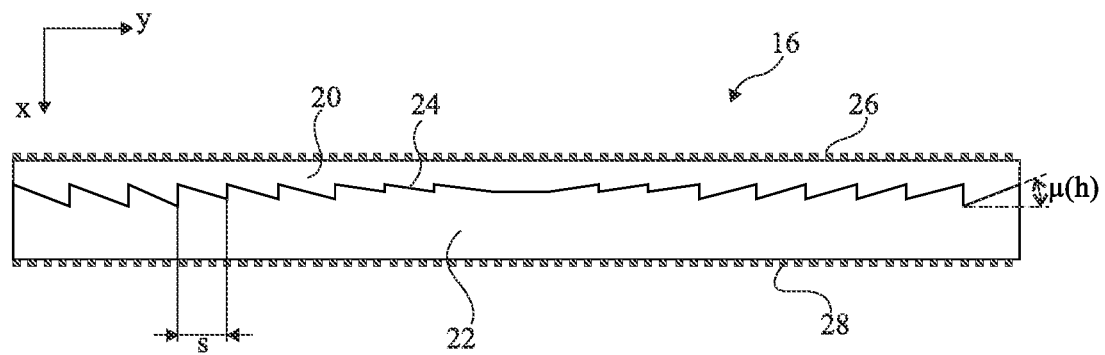
FIG. 4 illustrates an embodiment of a reflective structure of a head-up display according to an embodiment.

FIGS. 2 and 3 illustrate design parameters of such a mirror 16, and FIG. 4 illustrates an example of such a mirror.

FIG. 2 shows screen 14, which is placed vertically. A horizontal axis x running through center A of screen 14, a distance d which horizontally separates screen 14 from the mean position of mirror 16 (main plane of the mirror), and a distance D which separates, still horizontally, the mean position of mirror 16 from the plane where the virtual image of the mirror is desired to be formed, are here defined. A parameter G such that D=G·d is also defined. An axis y, perpendicular to axis x running through the mean position of mirror 16 is defined (this axis defining the main plane of the mirror). Axis y is thus distant from screen 14 by distance d. Further, the height separating axis x from a considered point of mirror 16 is called h.

For a light beam starting from point A of screen 14 to reach a point B on axis x at a distance from axis y equal to D, by being reflected by a point of mirror 16 located at a distance h from axis x, mirror 16 should be inclined with respect to axis y according to an angle called μ.

In this simple case, it is determined that angle μ, according to distance h, should be equal to:

$$\mu(h) = a\left(\arctan\left(\frac{Gd}{h}\right) - \arctan\left(\frac{d}{h}\right)\right) \quad (1)$$

a being a constant parameter, for example, equal to 0.5.

However, an angle μ(h) such as defined hereabove, although it is perfectly suitable for a beam starting from point A, degrades the resolution for points more distant from center. Indeed, as shown in FIG. 2, a light beam starting from a point A', off-centered with respect to screen 14, forms an image B' slightly blurred at a distance from axis y shorter than distance D.

The above equation is thus adapted to light beams coming from the center of screen 14, but degrades the forming of the image for light beams originating from the periphery of screen 14, which cannot be desired.

The inventor has thus attempted to improve the definition of angle μ(h) of inclination of the mirror at a distance h from axis x. His research, especially carried out by means of light beam simulation software known as ZEMAX, has led him to determining the following equation:

$$\mu(h) = \frac{1}{2} a \cos(\theta)^{f(G)} \left(\arctan\left(\frac{Gd}{h}\right) - \arctan\left(\frac{d}{h}\right)\right), \quad (2)$$

a being a constant parameter, for example, equal to 0.5, angle θ being the angle formed at point A between a direction joining the point of mirror 16 at a distance h from axis x and horizontal axis x. In other words, angle θ is θ=arctan(h/d). In the above equation, coefficient f(G) is a negative value which depends on parameter G. This value may be obtained by those skilled in the art by using ray tracing software such as that mentioned hereabove.

As an example of numerical values, if a distance d on the order of 200 mm is considered, a parameter G equal to 7 is selected so that the virtual image formed by the mirror is placed at a distance of substantially 2 m away from the observer (approximately 600 mm all the way to the mirror, plus distance G·d), and a screen having dimensions equal to 30 mm is chosen (to form an image visible under a 6° angle), optimal value f(G) is −0.3.

FIG. 3 illustrates results of a ray tracing enabling to determine this value.

This drawing simulates curves of the size of blurring b (assimilated to a plane at distance D from axis y) according to distance α from the source point of this image to the center of the screen. As can be seen in this drawing, for a zero value f(G), that is, in the case of equation (1), it can be seen that the size of the image formed by a point located at the center of the screen has a null size (a point forms a point). However, for a spacing of 20 mm from the center of the screen axis, the formed image has a significant size, which implies that it is blurred in the image plane. Taking f(G)=−0.6, the reverse effect occurs: the image formed by a central point of the screen is relatively blurred while the image formed by an off-centered point of the screen is of better quality (it is close to a point).

Thus, according to the desired parameter G, a ray tracing step enables to optimize above formula (2). For the above numerical application, a value of f(G)=−0.3 is a good compromise. A virtual image having an improved resolution and which is substantially homogeneous (same blurring size for all the beams provided by the screen) is thus obtained.

FIG. 4 illustrates the practical forming of a mirror according to an embodiment. In FIG. 4, the outside of the vehicle is located on the side of the lower portion of mirror 16 while the inside of the vehicle is located on the side of the upper portion of mirror 16.

To make the mirror compact, that is, with a thickness lower than 1 cm, it is provided to divide it into elementary portions of dimension s. As an example of implementation, pitch s may range between 0.1 and 0.5 mm, for example being on the order of 0.25 mm.

Mirror 16 is formed of two regions of same refraction indexes 20 on the driver side and 22 on the outer side of the vehicle, delimited by a broken separation line 24. Broken separation line 24 comprises first portions inclined with respect to the main plane of the mirror (extension plane thereof) which are semi-reflective, interconnected by non-reflective portions perpendicular to the main plane of the mirror. Broken line 24 forms, on each of the portions of pitch s, an angle μ with respect to the main plane of the mirror defined by means of the above equation, distance h selected to determine the angle of inclination of each of portions 24 being the mean distance h of the portion of pitch s. Each of the portions defining broken line 24 has a mean position along axis x located at a same value (defining the main plane of the mirror).

Due to the forming of the semi-reflective lines forming broken line 24 with a relatively low angular clearance along direction x, mirror 16 of FIG. 4 is relatively compact. Further, the definition of the slopes of the different semi-reflective portions provides a reflection of good quality and the forming of a virtual image of good quality at a desired distance (Gd) from the observer.

As an example, the inclined reflective surfaces of broken line 24 may be, to carry out this semi-reflection function, covered with a metallization made of a material having a transmission coefficient on the order of 70%, preferably greater than or equal to 70%, to correspond to the minimum value tolerated by automobile standards on a windshield. As an example, the metallization may be aluminum or silver, which have good reflection rate-vs.-absorption rate compromises. Thus, the observer who receives the information delivered by screen 14 and reflected by mirror 16 also receives information from the environment located behind this mirror. This enables to define a mirror in the passenger compartment of the vehicle which encroaches upon the driver's field of vision, without disturbing his vision of the outer environment. Indeed, with a structure of the type in FIG. 4, the reflected light provides an enlarged image sent back with a larger angle than the angle of incidence, while the transmitted light undergoes no deformation. The transmitted light is only attenuated due to the presence of the semi-reflective film. Thus, the image of the screen, reflected by the semi-reflective mirror, is enlarged and offset, while the light originating from the outer environment crosses the mirror without being deformed.

It should be noted that the general dimensions of the mirror are directly linked to the allowed displacement of the driver's head (so that he can see the projected information). The larger the mirror, the more the driver will have the possibility of moving and of perceiving the image reflected from the screen.

As a variation, an antireflection layer 26 may be formed on the surface of mirror 16 located on the driver side (upper surface in FIG. 4). An antireflection layer 28 may also be formed on the opposite surface of mirror 16 (lower surface in FIG. 4).

Figure 5:
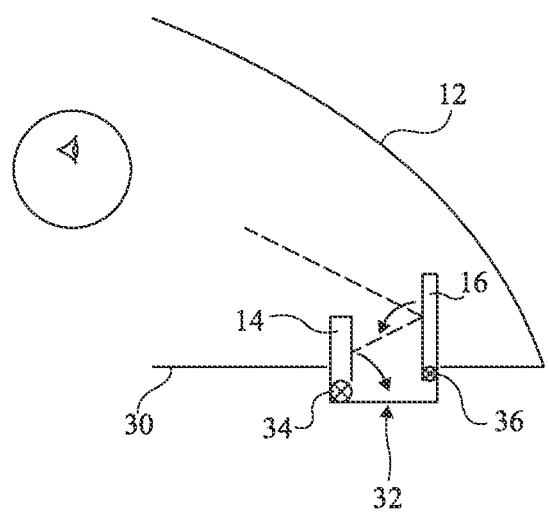
FIG. 5 illustrates a possible integration of a head-up display in the passenger compartment of a vehicle.

FIG. 5 schematically illustrates an embodiment of integration of the device provided hereabove in the passenger compartment of a vehicle.

In this embodiment, windshield 12 and a dashboard 30 of the passenger compartment of a vehicle are shown. A recess 32 is formed in dashboard 30.

A rotation axis 34 is formed at the bottom of this recess, on the driver side, screen 14 being rotatably assembled on this axis. Thus, screen 14 may fold into the back of the recess. Another rotation axis 36, parallel to axis 34, is formed at the back of the recess, opposite to the first rotation axis. Mirror 16 is rotatably assembled on axis 36 to enable to fold it into recess 32.

Thus, when screen 14 and mirror 16 are folded in the back of recess 32, they are perfectly integrated in dashboard 30.

A retractable solution as provided in FIG. 5, or according to an alternative embodiment, enables to activate the HUD only at times when it is useful and to integrate the elements providing the augmented reality in the passenger compartment when they are not used.

Advantageously, a mirror formed as provided in relation with FIG. 4, comprising elementary portions of selected slopes, is relatively compact and compatible with a small integration volume and a low bulk.

Specific embodiments of the present invention have been described. Various alterations and modifications will occur to those skilled in the art. In particular, the embodiment of FIG. 5 of a retractable device is an example only. It should be understood that this mechanical device may be replaced with many other devices enabling to integrate screen 14 and mirror 16 in the dashboard.

It should also be noted that, to further increase the compactness of the device, it may be provided to use additional planar mirrors so that the light beam originating from screen 14 reaches mirror 16 after one or several reflections on planar mirrors. This enables to further decrease the spacing between screen 14 and mirror 16.

It should further be noted that the vertical position of screen 14 and of mirror 16 is an example only and that those skilled in the art may easily size and structure similar devices where the position of screen 14 and of mirror 16 varies with respect to the vertical of the vehicle.

It should finally be noted that the angle of inclination of mirror 16 for a given value of distance h, that is, across the mirror width, may be constant all along this width, or may vary. In this last case, a structuring similar to the vertical structuring may be provided, along the depth axis of the drawings by performing calculations according to equation (2).

Various embodiments with different variations have been described hereabove. It should be noted that those skilled in the art may combine various elements of these various embodiments and variations without showing any inventive step. Especially, the forming of screen 14 has not been described in detail, the device provided herein being compatible with any form of image source.

The invention claimed is:

1. A head-up display, comprising an image source and a mirror positioned along parallel main planes and separated by a first distance (d), the mirror being shaped to form virtual images of the images provided by the image source at a second distance (D) from the mirror, greater than the first distance, the mirror being formed of a stack of two layers of same index separated by a broken line having inclined portions coated with a semi-reflective film, wherein the mirror comprises elementary portions, angle μ of each elementary portion with respect to the main plane of the mirror, according to distance h between the projection of the center of said portion on the plane of the image source and the center of the image source, being defined by the following equation:

$$\mu(h) = a\cos(\theta)^{f(G)}\left(\arctan\left(\frac{Gd}{h}\right) - \arctan\left(\frac{d}{h}\right)\right),$$

θ being defined by θ=arctan(h/d), G being the ratio between the second (D) and the first distance (d), f(G) being a negative value, and a being a constant parameter.

2. The display of claim 1, wherein value f(G) is non zero and determined by a ray tracing optimization step.

3. The display of claim 1, wherein the mirror has a thickness lower than 1 cm.

4. The display of claim 1, wherein the inclined portions have slopes following equation μ(h) and are interconnected by portions perpendicular to the main plane of the mirror.

5. The display of claim 1, wherein the inclined portions of the broken line are metallized.

6. The display of claim 5, wherein the metallization of the inclined portions of the broken line is made of a material having a transmission rate greater than or equal to 70%.

7. The display of claim 4, wherein the two layers of same index are covered with an antireflection layer.

8. A vehicle dashboard, comprising the head-up display of claim 1.

9. The dashboard of claim 8, wherein the image source and the mirror are retractable.

10. The dashboard of claim 8, wherein the image source and the mirror are assembled on axes to be folded in a recess of the dashboard.

* * * * *